(12) United States Patent
Dunjic et al.

(10) Patent No.: US 11,928,112 B2
(45) Date of Patent: *Mar. 12, 2024

(54) SYSTEMS AND METHODS FOR INTELLIGENT RESPONSES TO QUERIES BASED ON TRAINED PROCESSES

(71) Applicant: THE TORONTO-DOMINION BANK, Toronto (CA)

(72) Inventors: Milos Dunjic, Oakville (CA); Martin Albert Lozon, London (CA); David Samuel Tax, Toronto (CA); Arthur Carroll Chow, Markham (CA); Peter Glen Nairn, Cobourg (CA); Edward James Hood, Toronto (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 94 days.

This patent is subject to a terminal disclaimer.

(21) Appl. No.: 17/239,233

(22) Filed: Apr. 23, 2021

(65) Prior Publication Data

US 2021/0240778 A1    Aug. 5, 2021

Related U.S. Application Data

(63) Continuation of application No. 16/150,483, filed on Oct. 3, 2018, now Pat. No. 11,017,028.

(51) Int. Cl.
*G06F 16/2455* (2019.01)
*G06F 9/54* (2006.01)
(Continued)

(52) U.S. Cl.
CPC ............ *G06F 16/2455* (2019.01); *G06F 9/54* (2013.01); *G06N 20/00* (2019.01); *G10L 15/063* (2013.01)

(58) Field of Classification Search
CPC ............ G06F 16/2443; G06F 16/2453; G06F 16/2455
See application file for complete search history.

(56) References Cited

U.S. PATENT DOCUMENTS 6,757,362 B1    6/2004   Cooper et al.
9,589,578 B1    3/2017   Dippenaar
(Continued)

FOREIGN PATENT DOCUMENTS

WO    2001067241 A1    9/2001
WO    2017041008 A1    3/2017

OTHER PUBLICATIONS

Purushotham Botla; Designing Personal Assistant Software for Task Management Using Semantic Web Technologies and Knowledge Databases; Working Paper; May 11, 2013; 112 pages.

*Primary Examiner* — Grace Park

(57) ABSTRACT

Systems and methods are provided that use a trained process to reply to a request comprising query data defining a query and context data defining contextual factors for the query from a device. The query is answered by one or more selected APIs of a plurality of APIs that invoke respective services to prepare a response. The trained process determines an execution plan responsive to the query data and the context data and is configured using training to define execution plans comprising selected APIs where a particular API is selected for the plan if it answers at least a portion of the query and the selected APIs together prepare the response optimized for the device according to the context data. The plan is provided to an execution component to execute the plan using the selected APIs and send the response to the requesting device.

34 Claims, 7 Drawing Sheets

(51) Int. Cl.
    *G06N 20/00*     (2019.01)
    *G10L 15/06*     (2013.01)

(56) References Cited

U.S. PATENT DOCUMENTS

| | | |
|---|---|---|
| 2002/0107852 A1 | 8/2002 | Oblinger |
| 2003/0182347 A1 | 9/2003 | Dehlinger |
| 2008/0133504 A1 | 6/2008 | Messer et al. |
| 2011/0153644 A1* | 6/2011 | Kosuru .................. G06F 16/24 |
| | | 707/769 |
| 2011/0264656 A1* | 10/2011 | Dumais ............... G06F 16/9537 |
| | | 707/765 |
| 2014/0229462 A1 | 8/2014 | Lo |
| 2015/0169385 A1* | 6/2015 | Allen ...................... G06F 9/466 |
| | | 719/328 |
| 2015/0254561 A1* | 9/2015 | Singal ............... G06F 16/24542 |
| | | 706/50 |
| 2016/0098992 A1 | 4/2016 | Renard et al. |
| 2016/0352867 A1 | 12/2016 | Subbarayan et al. |
| 2017/0046124 A1* | 2/2017 | Nostrant ................. G06F 3/167 |
| 2017/0330215 A1 | 11/2017 | Bruno et al. |
| 2018/0046475 A1* | 2/2018 | Wei ................... G06F 16/90324 |
| 2018/0204145 A1 | 7/2018 | Horovitz et al. |
| 2019/0197163 A1 | 6/2019 | Morris et al. |
| 2019/0294925 A1* | 9/2019 | Kang .................. G06K 9/6256 |
| 2019/0385060 A1 | 12/2019 | Carmeli et al. |
| 2020/0034215 A1* | 1/2020 | Petrillo ................. G06F 9/4881 |
| 2020/0081814 A1 | 3/2020 | Srinivasan et al. |
| 2020/0219010 A1* | 7/2020 | Jobling ................ G06F 16/285 |

\* cited by examiner

SYSTEMS AND METHODS FOR INTELLIGENT RESPONSES TO QUERIES BASED ON TRAINED PROCESSES

CROSS-REFERENCE

This application is a continuation of U.S. patent application Ser. No. 16/150,483, filed Oct. 3, 2018, the entire contents of which are incorporated herein by reference.

FIELD

This application relates to computer processing of queries and more particularly to systems and methods for intelligent responses to queries based on trained processes.

BACKGROUND

There are many different contexts where one computing device (the requesting device) requests information from another (the responding device) via a query. Requesting devices making requests of the responding device may be of different types or configurations resulting in different capabilities. For example, different mobile devices may have vastly different capabilities in terms of storage and processing power. Requesting devices may use native applications, browsers, or other device interfaces to make requests and present responses. Requesting devices may use different communication networks, which may vary from time to time. Some requesting devices may communicate via a wired connection with high bandwidth and low latency and other requesting devices may communicate via a wireless connection with low bandwidth and/or high latency, etc. In some instances the same requesting device may communicate some requests via one communication manner and other requests, (e.g. at another time), via another communication manner as the requesting device is a mobile device connected to different networks at different times. These various device capabilities and communication capabilities present challenges to the responding device. Responding in a like manner to each query may lead to wasted resources and/or a failure to take advantage of all resources available. Additionally, the user experience may not be maximized.

SUMMARY

Systems and methods are provided that use a trained process to reply to a request comprising query data defining a query and context data defining contextual factors for the query from a device. The query is answered by one or more selected APIs of a plurality of APIs that invoke respective services to prepare a response. The trained process determines an execution plan responsive to the query data and the context data and is configured using training to define execution plans comprising selected APIs where a particular API is selected for the plan if it answers at least a portion of the query and the selected APIs together prepare the response optimized for the device according to the context data. The plan is provided to an execution component to execute the plan using the selected APIs and send the response to the requesting device.

There is provided a computing device comprising: a processor; a communications component coupled to the processor; and a storage device coupled to the processor, the storage device storing instructions to configure operation of the computing device when executed by the processor. The computing device is configured to: receive a request from a requesting device via the communications component, the request comprising query data defining a query and context data defining contextual factors for the query, where one or more selected APIs of a plurality of APIs that invoke respective services prepare a response to the query for the requesting device; invoke a trained process to determine an execution plan responsive to the query data and the context data, wherein the trained process is configured using training to define execution plans comprising selected APIs from the plurality of APIs, where a particular API of the plurality of APIs is selected for the execution plan if the particular API is configured to answer at least a portion of the query and the selected APIs together prepare the response optimized for the requesting device according to the context data; and provide the execution plan to an execution handling component to execute the execution plan to prepare the response to send to the requesting device.

The computing device may be further configured to receive the execution plan at the execution handling component; prepare the response according to the execution plan; and send the response to the requesting device.

The trained process may be trained with training query data, training context data and respective measures of success using a regression method or a classification method. The classification method may be a supervised method, a semi-supervisor method, or an unsupervised method. The supervised method may comprise using one or more of a neural network, a support vector machine, linear or quadratic discriminant analysis, and boosting. The unsupervised method may comprise using one or more of k-means (clustering), Gaussian mixture models, and principal or independent component analysis.

The computing device may be configured to, in response to an addition of a new API, a change to an existing API or a removal of an existing API in the plurality of APIs: retrain the trained process to incorporate the new API, change to the existing API or removal of the existing API for generating new execution plans responsive to applicable training query data and applicable training context data for the new API, change to the existing API or removal of the existing API.

The computing device may be configured to collect information whether the response was successful as a specific measure of success, and adaptively train the trained process using the specific measure of success.

Context data may comprise any of: device data comprising: make and model data; configuration data; processor speed data; output capabilities data comprising: display and/or voice/sound type data, natural language output data, display screen capabilities data comprising: size data, resolution data, and colour data; size of device storage data; device request interface data comprising native application data browser data or other interface data; and device location data; communication data comprising: network name and/or type data; speed data; latency data; QOS parameters data; and user specific data comprising demographic information associated with the user of the device; and a user identifier indicating a user of the device.

The computing device may be configured to assign default context data when at least some context data is missing from the request.

The computing device may be configured to process the request using natural language processing techniques.

The selected APIs may invoke a respective service which requires user authentication to access the respective service and wherein the computing device is configured to receive a user authentication for the respective service and provide the user authentication to the respective service.

The query data and the context data may be received according to one or both of: i) directly from the requesting device and ii) on behalf of the requesting device from a third party.

There is provided a computer implemented method comprising: receiving at a processor a request from a requesting device via a communications component coupled to the processor, the request comprising query data defining a query and context data defining contextual factors for the query, the query for processing by one or more selected APIs of a plurality of APIs that invoke respective services to prepare a response for the requesting device; invoking a trained process to determine an execution plan responsive to the query data and the context data, wherein the trained process is configured using training to define execution plans comprising selected APIs from the plurality of APIs, where a particular API of the plurality of APIs is selected for the execution plan if the particular API is configured to answer at least a portion of the query and the selected APIs together prepare the response optimized for the requesting device according to the context data; and providing the execution plan to an execution handling component to call the selected APIs to prepare the response to send to the requesting device.

These and other aspects and features will be apparent to one of ordinary skill in the art. For example it will be apparent that there is disclosed a computer program product comprising a storage device storing instructions in a non-transient manner (e.g. not as a signal on a wire, etc.), the instructions, when executed by a processor of a computing device, configure the computing device to perform a method as described herein.

DETAILED DESCRIPTION

Figure 1:
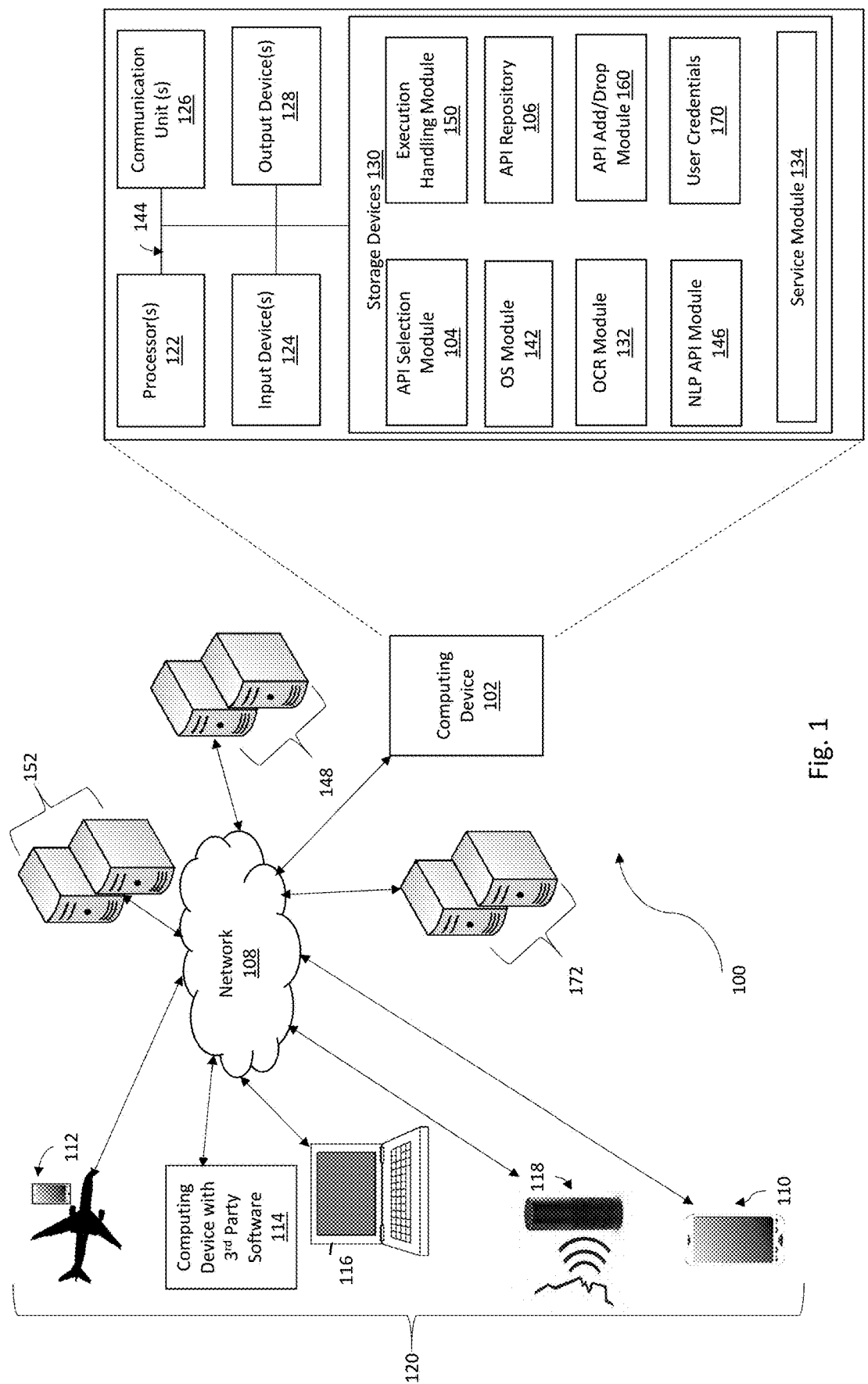
FIG. 1 is a block diagram of a representative computer network also showing details of an example computing device.

FIG. 1 is a block diagram of a representative computer network 100 illustrating an computing device 102, in accordance with an example of the teachings herein, communicating via one or more communication networks 108 and configured to select APIs, in accordance with one or more aspects of the presented disclosure. Simplified details of computing device 102 are illustrated and enlarged thereof. Computing device 102 is communicating using one or more communication networks 108 with one or more other requesting computing devices (e.g., 110, 112, 114, 116, 118, and collectively 120). Computing device 102 may receive respective query and context data from respective requesting computing devices 120 and generate and output respective signals for data transfer to the requesting computing devices 120. A particular query may include a request for details on bank transactions, video and image, news, social media feeds, etc. Computing device may communicate via communication networks 108 to one or more other computing devices, for example, servers 148.

In the example of FIG. 1, computing device 102 is a distributed computing service on a network. Other examples of computing device 102 is a single computer, cloud computing services, a laptop computer, a tabletop computer, or another type of computing device. In the example of FIG. 1 requesting computing device is a cell phone, a laptop, an intermediary third party, etc., each may have different storage capacity, processing power, device query interfaces (e.g. native application, browser, etc.), communication capabilities and communication connections with different qualities when communicating queries and responses with computing device 102. Requesting computing devices 120 are any devices that have at least one processing device and memory (storage device), that is capable of sending queries and receiving responses.

Computing device 102 is coupled for communication to communication networks 108 which may be a wide area network (WAN) such as the Internet. Communication networks 108 are coupled for communication with requesting computing devices 120. It is understood that communication networks 108 are simplified for illustrative purposes. Additional networks may also be coupled to the WAN or comprise communication networks 108 such as a wireless network and/or a local area network (LAN) between the WAN and computing device 102 or between the WAN and any of requesting computing devices 120.

FIG. 1 shows an enlargement of computing device 102, in accordance with one or more aspects of the present disclosure, for example, to provide a system and perform a method to select an optimal set of APIs to generate a successful response.

Computing device 102 receives respective query and context data from respective requesting computing devices 120 or from other devices on their behalf, such as communication networks 108. In some examples, the query data and the context data may be in the form of one or more of a text of characters, a sound recording of characters, or an image of the characters, and queries may be in a natural language. Computing device 102 comprises one or more processors 122, one or more input Devices 124, one or more communication units (e.g. communication unit 126) and one or more output devices 128. Computing device 102 also comprises one or more Storage devices 130 storing one or more modules such as API selection module 104, API repository 106, optical recognition module 132, and operating system module 142, and service module 134. Service module 134 is a storage function that stores digital information on local storage medium or stores it remotely on a cloud.

Communication channel 144 may couple each of the components 122, 124, 126, 128, and 130 (and modules therein), for inter-component communications, whether communicatively, physically and/or operatively. In some examples, communications channels 144 may include a system bus, a network connection, and inter-process communication data structure, or any other method for communicating data.

Processors 122 may implement functionality and/or execute instructions within computing device 102. For example, processors 122 may be configured to receive instructions and/or data from storage devices 130 to execute the functionality of the modules shown in FIG. 1.

The one or more communication units (e.g. communication unit 126) allow the capability to communicate with requesting computing devices via one or more communication networks 108 by transmitting and/or receiving network signals on the one or more networks. The communication units may include various antennae and/or network interface cards, etc. for wireless and/or wired communications.

Input devices 124 and output devices 128 may include any of one or more buttons, switches, pointing devices, one or more cameras, a keyboard, a pointing device, a microphone, one or more sensors (e.g., biometric, etc.), a speaker, a bell, one or more lights, a display screen (which may be a touchscreen device providing I/O capabilities), etc. One or more of same may be coupled via a universal serial bus (USB), Bluetooth™ or other communication channels (e.g., via communication unit 126). That is, input and output devices may be on computing device 102 or coupled thereto via wired or wireless communication.

Computing device 102 may store data/information to storage devices 130, which may comprise, for example, machine learning trained processes, previous query data and context data used to prepare responses to respective requesting computing devices, and the result of such response on whether being successful or not (e.g. a measure of success), also stored may be execution plans for such responses. Some of the functionality is described further herein below. The one or more storage devices 130 may store instructions and/or data for processing during operation of computing device 102. The one or more storage devices 130 may take different forms and/or configurations, for example, as short-term memory or long-term memory. Storage devices 130 may be configured for short-term storage of information as volatile memory, which does not retain stored contents when power is removed. Volatile memory examples include random access memory (RAM), dynamic random access memory (DRAM), static random access memory (SRAM), etc. Storage devices 130, in some examples, also include one or more computer-readable storage media, for example, to store larger amounts of information than volatile memory and/or to store such information for long-term, retaining information when power is removed. Non-volatile memory examples include magnetic hard discs, optical discs, floppy discs, flash memories, or forms of electrically programmable memory (EPROM) or electrically erasable and programmable (EEPROM) memory.

API selection module 104 may be configured to receive query and context data from respective requesting computing devices to instruct the performance of identifying an API or a plurality of APIs stored in the API repository 106. The query and context data may be received electronically via communication unit(s) 126 if it is a text query, via communication unit(s) 126 through the OCR module 132 if the query is in the form of images of characters, and via communication unit(s) 126 through the NLP API module 146 if the query is in the form of sounds of characters. The API selection module acts like a function that its input is query and context data and its output is an optimal set of one or more APIs that provide a successful response to a particular query from one of the requesting computing devices 120. It is understood that query and context data may be pre-processed such as by a computing device (not shown) configured for pre-processing text, sound or images before receipt by computing device 102 so that computing device 102 receives "normalized" query and context data in a standard form, off-loading the processing requirements of computing device 102. Similarly responses may be passed to a computing device to convert a response to sound or other output forms, for example as directed by the API selection module.

In one example, a query may ask for bank account details from servers 148. The API selection module 104 may receive the request data and context data to determine a set of APIs from a plurality of APIs available to computing device 102 to respond thereto. The plurality of APIs (e.g. their respective definitions or specifications) are stored in API repository 106. The API selection module selects the set of APIs to optimize a response taking into account the context data to generate a successful response to the query. The set of APIs is used to define an execution plan. The execution plan is executed by an execution handling module 150. With a bank account details query (or any query), there may exist different context data. Context data comprise information providing contextual factors about the requesting computing device and/or any communication aspect for the query. Context data may include but is not limited to: device data such as make and model, processor speed data, output capabilities data (including type such as display and/or voice/sound, natural language output, etc.), display screen capabilities data (size resolution, colour, etc.), device request interface data (native application, browser or other interface), communication data including network name and/or type, speed, latency, QOS parameters, etc.

The computing device may be configured to assign default context data when at least some context data is missing from the request. The default data may be selected to be average or typical data for similar requests determined over time such as for a specific user associated with the request, using some context data received and extrapolated using similar requests with such received context data.

In one example, the context data may be from a requesting device 110 which may be a cellphone. Pertinent context data may include device data, communication (network) data, and user specific data. For example, device data may comprise make and model data; configuration data processor speed data; output capabilities data comprising: display and/or voice/sound type data, natural language output data, display screen capabilities data comprising: size data (e.g. a limited screen size compared to a large monitor of a desktop), resolution data, and colour data; device request interface data comprising native application data, browser data or other interface data (e.g. native application where graphical elements may be stored locally vs a browser where more graphical elements may be needed); size of device storage (e.g. small storage compared to desktop computers); and device location data. Communication data may comprise network name and/or type data; speed data (e.g. whether there is a high-speed internet connection or not); latency data; and QOS parameters data. User specific data may comprise demographic information associated with the user of the device; and a user identifier indicating a user of the device. Demographic data may be useful to select interfaces/data by age or other variable. User identifier may select among profile information and preferences.

In one example, computing device 102 may determine the set of APIs in two stages. It may determine which of the plurality of APIs in API repository 106 are capable of responding to the specific query and then use the context data to select the optimal set of APIs to invoke to obtain account details information such as from servers 148. API selection module 104 uses a machine learning trained process with previous query and context data along with a respective measure of success to determine the set of APIs for defining the execution plan. In this query example, it may be preferred that the response has limited account information avoiding an overly long list of activities that the requesting computing device may not be able to display on the screen.

In another example, a query may ask for images or videos with specific details from servers 148 requested by cell phone requesting device 110. Computing device 102 via API selection module 104 selects a set of API that can generate a response to the query using API selection module 104. The machine learning trained process therein uses the query data and context data for defining the execution plan from the set of APIs as selected. In this example, the response may request sending a thumbnail of videos and images or a lower resolution version of the videos and the images.

In another example, query data may request bank account details with context data from a requesting computing device 112 such as a cellphone on an airplane. A cellphone on an airplane may have a slow internet connection speed, latency issues, etc. The optimal set of APIs may generate a response with compressed or a limited amount of information that may lead to a successful response. In another example, a requesting computing device 116 is a high-speed laptop. Requesting computing device 116 has a high-speed internet connection, a large display relative to a mobile phone and a sufficient amount of storage. The computing device 102 generates an execution plan from the set of APIs that when executed retrieves and responds with more data than when requesting computing device 112 sends the same query but with different context data. For example, requesting computing device 116 may get the data for the last 100 transactions (or last month) while requesting computing device 111 would get data for the last 10 transactions (or last X days to a max of Y transactions).

In another example, a requesting computing device requires natural language processing capability such as requesting computing device 118 which is configured to receive and send voice queries in a natural language (rather than a computer language). Context data of this requesting device may be a fast internet connection and no display. Computing device 102 uses NLP API module 146 to convert the sound query into a text query (if necessary) and translate the natural language of the query into a form that is compatible with API selection module 104. API selection module 104 sends a request to a trained process on query data to refine the set of APIs in the API Repository that may generate a successful response. Afterwards, API selection module 104 through a trained process on the context data may send a signal to select an optimal set of APIs that may generate a successful response. Computing device 102 via execution handling module 150, invokes severs 148 or 172, or other computing devices, via the selected APIs to retrieve information and communicates the response to the requesting computing device 118.

In another example, a requesting computing device 114 uses third party software for displaying and otherwise working with information. One such example is software for personal finance, money management and budgeting. Requesting computing device 114 may communicate with servers 152 for some services. Third party software may provide an interface to obtain financial information regarding one or more accounts from one or more financial institutions for a user of the third party software. Requesting computing device 114 may request information from computing device 102 via servers 152 or directly.

Requests from any of the requesting computing devices may require a user authorization to receive a response with a user's information. Requests may include user authorization.

Existing APIs may change or no longer be available, new APIs may become available. API change/add/drop module 160 provides functionality to configure the API selection module to account for API changes as described further below.

Some APIs require authentication to enable use of the respective service. The computing device 102 may be configured (e.g. via user credentials module 170) to receive a user authentication for the respective service and provide the user authentication to the respective service. In some examples, the user credentials may be received for services provided by APIs under the control of the entity that provides computing device 102 (for example, a first financial institution (e.g. a bank)). Such APIs may be locally provided by computing device 102 or servers (e.g. 148) from the same entity (i.e. the first financial institution). In some examples, the (same) user credentials may be received for use with additional services provided by APIs under the control of a second entity providing services such as via servers 172 of another (i.e. a second) financial institution (e.g. a second bank). The various API definitions are described in API repository 106 and services where user credentials can be shared from computing device 102 are annotated as such. By way of example, a request from the requesting computing device 114 may request account balance information for accounts of a user at multiple financial institutions, providing user authentication with the request. Shared credentials provide access to this information via computing device 102 from various servers as associated with the respective APIs. A single response with the account balance information may be prepared and returned, with the API selecting the APIs to define an appropriate execution plan for execution handling module 150.

Figure 2:
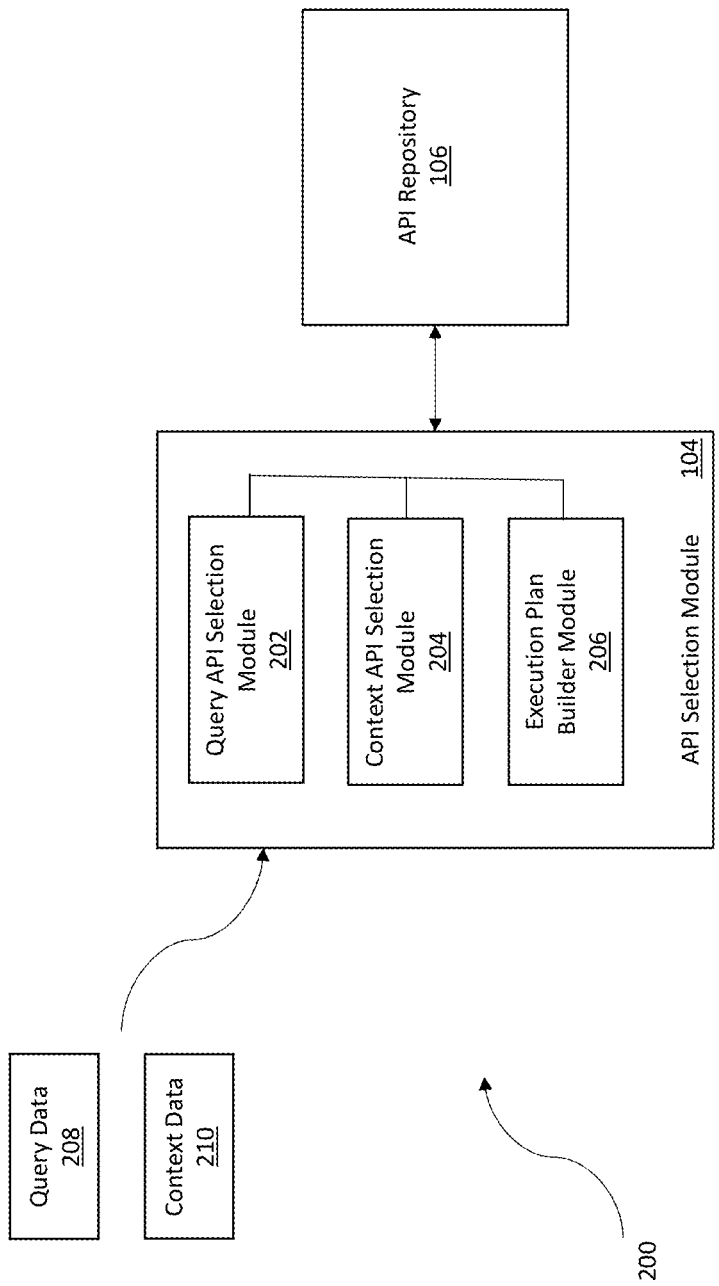
FIG. 2 is a block diagram of an embodiment of an application programming interface (API) selection module.

FIG. 2 shows an embodiment of the API selection module 104. API selection module 104 comprises a query API selection module 202, a context API selection module 204 and an execution plan builder 206. API selection module 104 is responsible for defining execution plans for execution handling module 150 to execute the selected APIs from API repository 106.

In the present example, selecting an optimal set of APIs comprises a two-stage process invoking query API selection module 202 then context API selection module 204. Query API selection module 202 uses a machine learning trained process to select an initial set of APIs that may generate a successful response to the query data 208 disregarding the context data 210. Context API selection module 204 then selects from the initial set of APIs to generate an optimized set for preparing a response to the requesting computing device. Context API selection module 204 may also determine that one or more additional APIs are to be included, for example, to process output from one of the initial APIs to satisfy the context data. Execution plan builder 206 defines the execution plan using the optimized set for execution by execution handling module 150.

Figure 3:
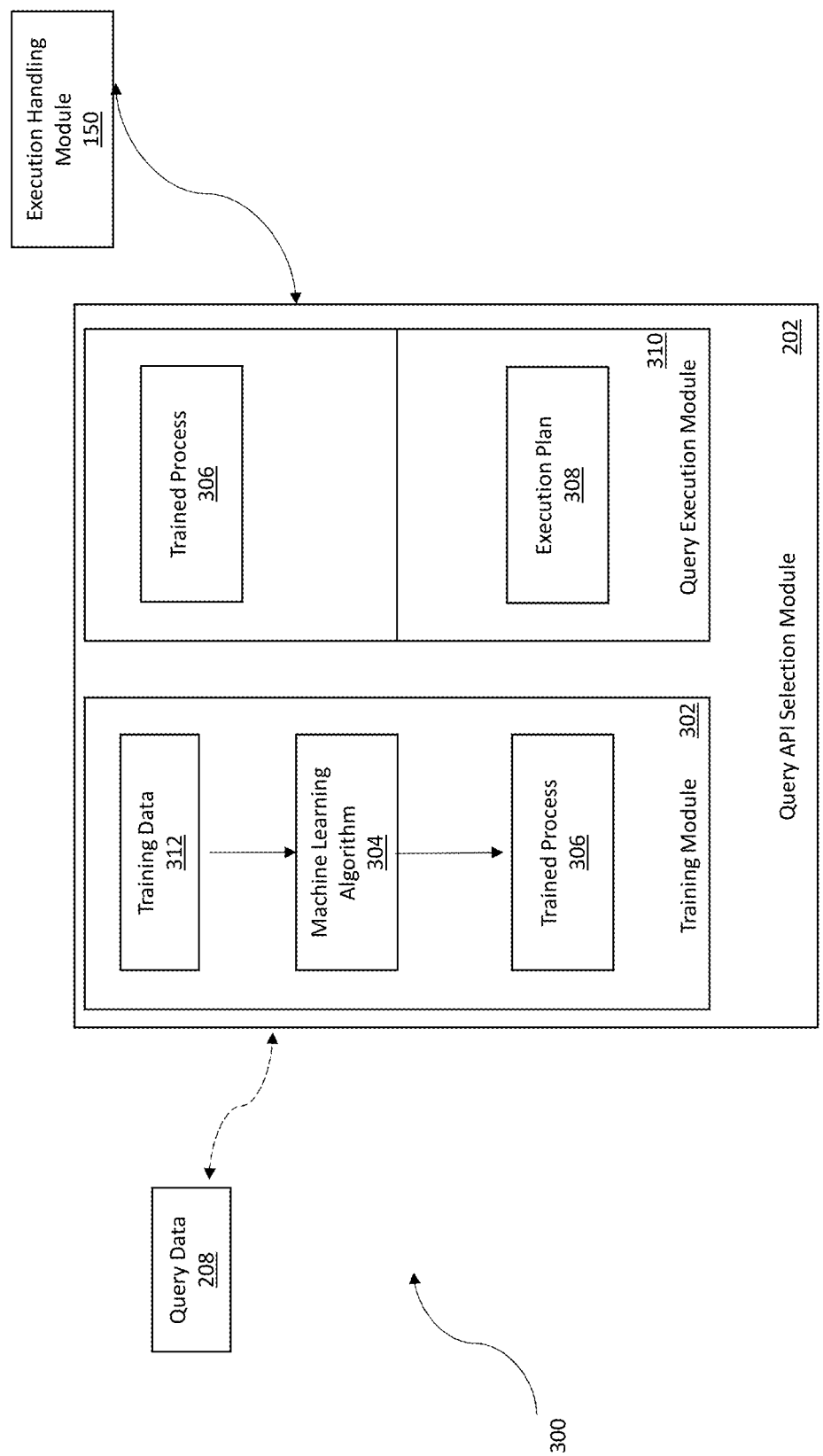
FIG. 3 is a block diagram showing more detail of FIG. 2 according to an embodiment of a query API selection module.

FIG. 3 shows an embodiment of the query API selection module 202. Query API selection module 202 is configured to perform two operations: training through training module 302 and execution through query execution module 310.

Training module 302 generates a trained process 306 for use by query execution module 310 to select an initial set of APIs. Training module 302 comprises training data 312 and machine learning algorithm 304. Training data 312 is a database of query data 208 and respective measures of success. Machine learning algorithm 304 can be a regression or a classification method. The machine learning algorithm attempts to find an optimal trained process 306. The trained process 306 is a function that maps each query in the training data to a respective set of APIs that would generate an optimal measure of success. That is, the set of APIs (or a subset thereof), if executed would answer the query successfully to obtain the requested information. This set of APIs may include two or more APIs that perform the same or overlapping functions such that only some of such APIs will actually be executed, depending on the context data. For example, one API may be configured to produce information in one format and another API may be configured to produce information in another format, and context data may be used to select which API is used at execution time. Some APIs may produce additional information than is minimally required to satisfy the query. Depending on the context data, these APIs may be selected or not selected.

In one aspect, the machine learning algorithm is a regression method using one or more of linear regression, logistic regression, and polynomial regression. In another aspect, the machine learning algorithm is a supervised classification using one or more of neural network, support vector machine, linear or quadratic discriminate analysis, and boosting. In another aspect, the machine learning algorithm is an unsupervised classification using one or more of k-means (clustering), Gaussian mixture models, and principal or independent component analysis.

Query execution module 310 uses the trained process 306 to find an optimal relationship between the query data and a set of APIs that may generate a successful query response. Query execution module receives query data via communication networks 108, and generates data, for example, an unrefined execution plan 308 that comprises an initial set of APIs that may generate a successful response to the query.

Figure 4:
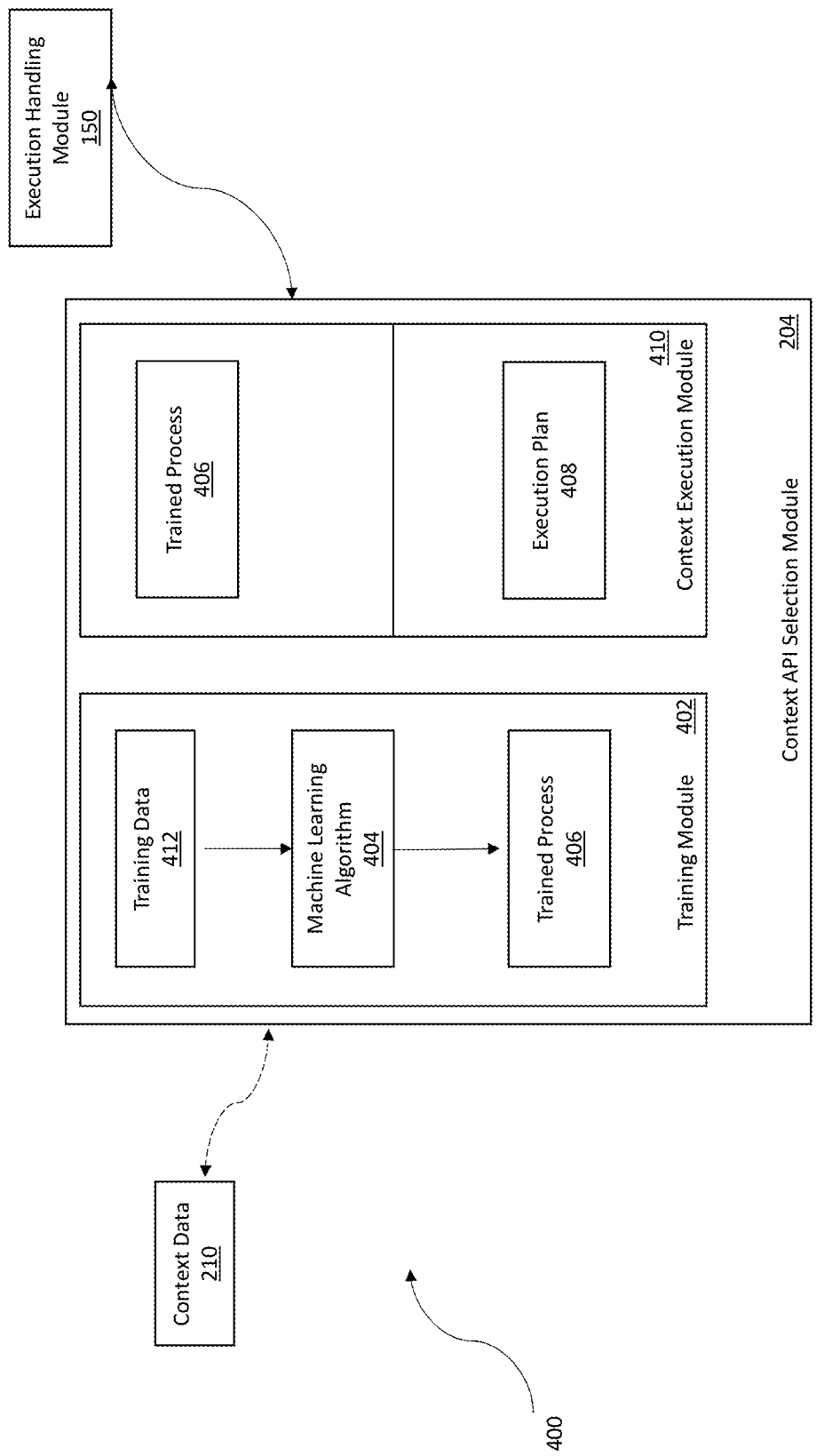
FIG. 4 is a block diagram showing more detail of FIG. 2 according to an embodiment of a context API selection module.

FIG. 4 shows an embodiment of the context API selection module 204. Context API selection module 204 is configured to perform two operations: training through training module 402 and execution through context execution module 410. Context API selection module 204 receives context data 210, receives the unrefined execution plan comprising the initial set of APIs from query API selection module 202 to select an optimal set of APIs for generating an optimal response to the requesting computing device.

Training module 402 generates a trained process 406 that context execution module 410 uses to define an optimal set of APIs. Training module 402 comprises training data 412 and machine learning algorithm 404. Training data 412 is a database of context data and respective measures of success. Machine learning algorithm 404 can be a regression or a classification method. The machine learning algorithm attempts to find an optimal trained process 406. Trained process 406 is a function that maps training data 412 to a set of APIs that would generate an optimal measure of success.

In one aspect, the machine learning algorithm 404 is a regression method using one or more of linear regression, logistic regression, and polynomial regression. In another aspect, the machine learning algorithm is a supervised classification using one or more of neural network, support vector machine, linear or quadratic discriminate analysis, and boosting. In another aspect, the machine learning algorithm is unsupervised classification using one or more of k-means (clustering), Gaussian mixture models, and principal or independent component analysis.

Context execution module 410 uses the trained process 406 to find an optimal relationship between the context data and the set of APIs generated from query API selection module 202 to select the optimal APIs and may also include adding APIs based on context data as described. Context execution module 410 generates data (e.g. execution plan 408) to provide to execution plan builder 206 to complete the execution plan according to the present example. It is understood that when the query API selection module and/or context API selection module select a set of APIs from the plurality of APIs stored in API repository 106, the set comprises the identification of the respective APIs rather than the APIs themselves. The execution plan builder 206 may use the identification to build the execution plan using the actual APIs identified, using the definitions from API repository 106 for example. Execution plan builder 206 may be configured to wrap the set of APIs in a descriptive document with execution parameters from the query data and/or context data as a bundle such as in any mark-up or other language for consumption by execution handling module 150.

Figure 5:
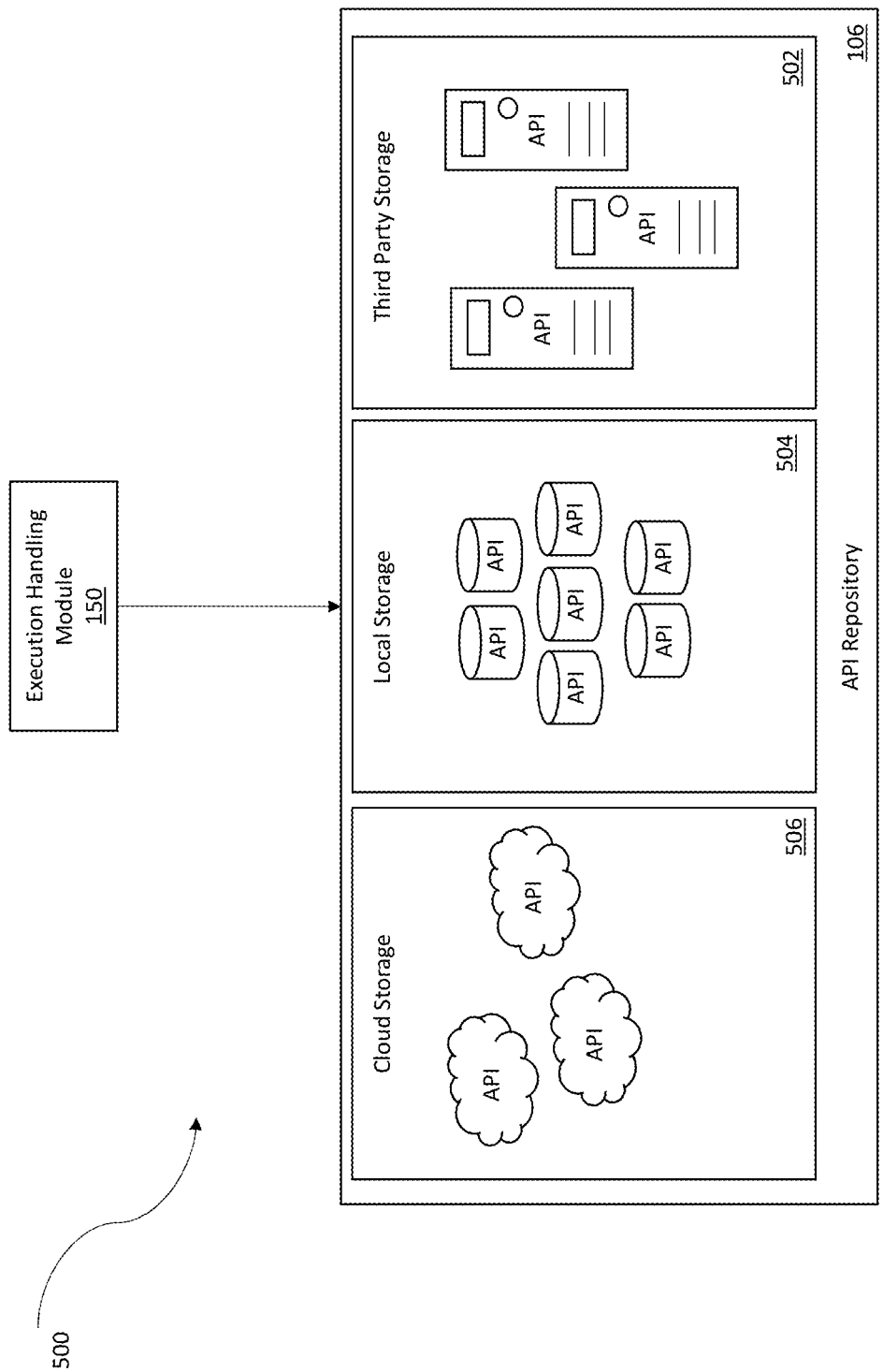
FIG. 5 is a block diagram showing more detail of FIG. 1 according to an embodiment of an API repository.

FIG. 5 shows an embodiment of API repository 106. API repository 106 stores APIs from three sources that execution handling module 150 may invoke. Third party storage 502 is a set of APIs to actual implementations provided by third-party servers that the execution handling module is capable of invoking via communication unit 126. Local storage 504 comprises APIs provided locally in the computing device 102 and the execution handling module can invoke. Cloud storage 506 are APIs to implementations owned by the entity that owns computing device 102 but which reside in a cloud services platform such as Google Cloud Platform (GCP), Amazon Web Service Cloud (AWS), Microsoft Azure Cloud Computing Platform, etc.

In one aspect, API repository 106 may not have a fixed set of APIs, as new APIs may become available. Existing APIs may change and/or may be deleted. API change/add/drop module 160 is configured to retrain API selection module 104 such as by using training module 302 and training module 402 to introduce the APIs to query API selection module 202 and context API selection module 204 to utilize them in their respective machine learning algorithm to define an optimal set of APIs. Appropriate training data may be defined to train for a new API, where a new API is either a changed existing API or one never seen before. Similarly the trained processes may be retrained to account for an existing API that is no longer available.

Additionally or in the alternative, live training may be used to refine the trained process 306 and the trained process 406 including, for example, adding new APIs. A feedback mechanism may be used to collect information to determine specific measures of success for respective responses using the execution plans. The feedback may measure certain response parameters automatically (e.g. speed of execution/completion, follow-up response from requesting computing device, whether a response to a query is successful or not because the same query is repeated) or may be based on specific feedback via input from the requesting client device (e.g. a poll). The feedback may be used with the query and context data to generate the execution plan and adaptively train the trained process. Though not shown, computing device 102 may be configured to store for each query (or fewer such) the respective query data and context data and associate same with the specific measure of success determined for the respective response. This may be used as training data to adaptively train (or retrain) the trained process. However, care may be taken to limit exposing users to responses that are not optimally successful.

Figure 6:
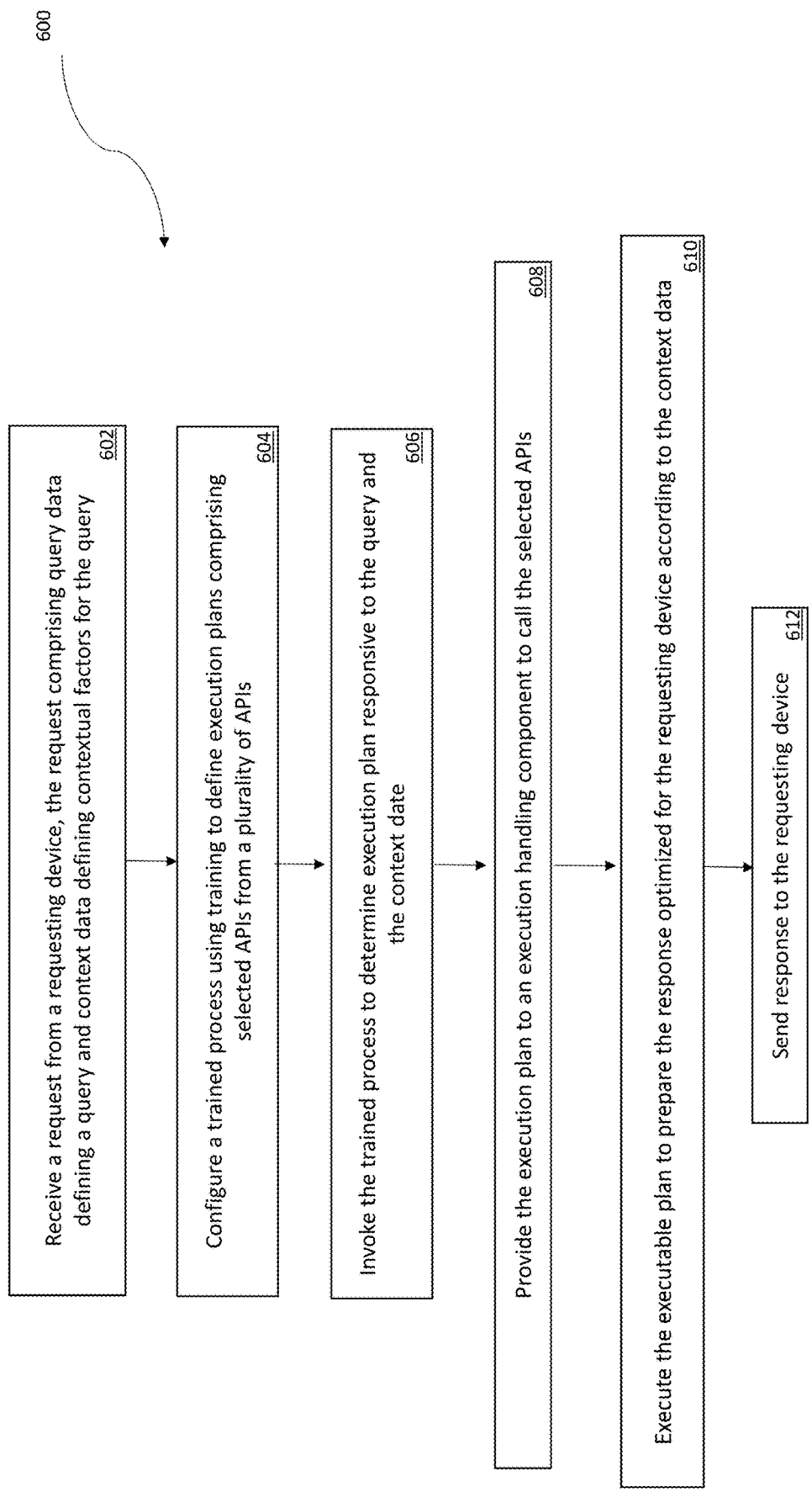
FIGS. 6 and 7 are flowcharts of operations for a computing device in accordance with an embodiment.

FIG. 6 is a flowchart that illustrates operations 600 of a computing device, in accordance with an aspect of the present disclosure. Operations 600 select and execute an optimal set of APIs to prepare a response to the requesting computing device.

At 602, computing device 102 receives query data and context data from a requesting device (e.g. one of requesting computing devices 120). The query may comprise a text of characters (which may be a natural language query), a sound recording of characters (e.g. which may be a natural language query), or an image of text characters requiring pre-processing. The computing device, through NLP API module 146 or OCR module 132 as may be applicable transforms the query into a form of query acceptable to API selection module 104. Some queries may not need any transformation.

At 604, a trained process is configured using training to define execution plans comprising selected APIs. At 606, the trained process is invoked to determine an execution plan responsive to the query data and context data to collect a subset of APIs that may generate a successful response to the query and determine an optimized execution plan from the subset of APIs generated by query data. At 608, the execution plan is provided to an execution handling module to call the selected APIs. At 610, the executable plan is executed to invoke the selected APIs to prepare the response. At 610, the response is then sent to the requesting device.

Figure 7:
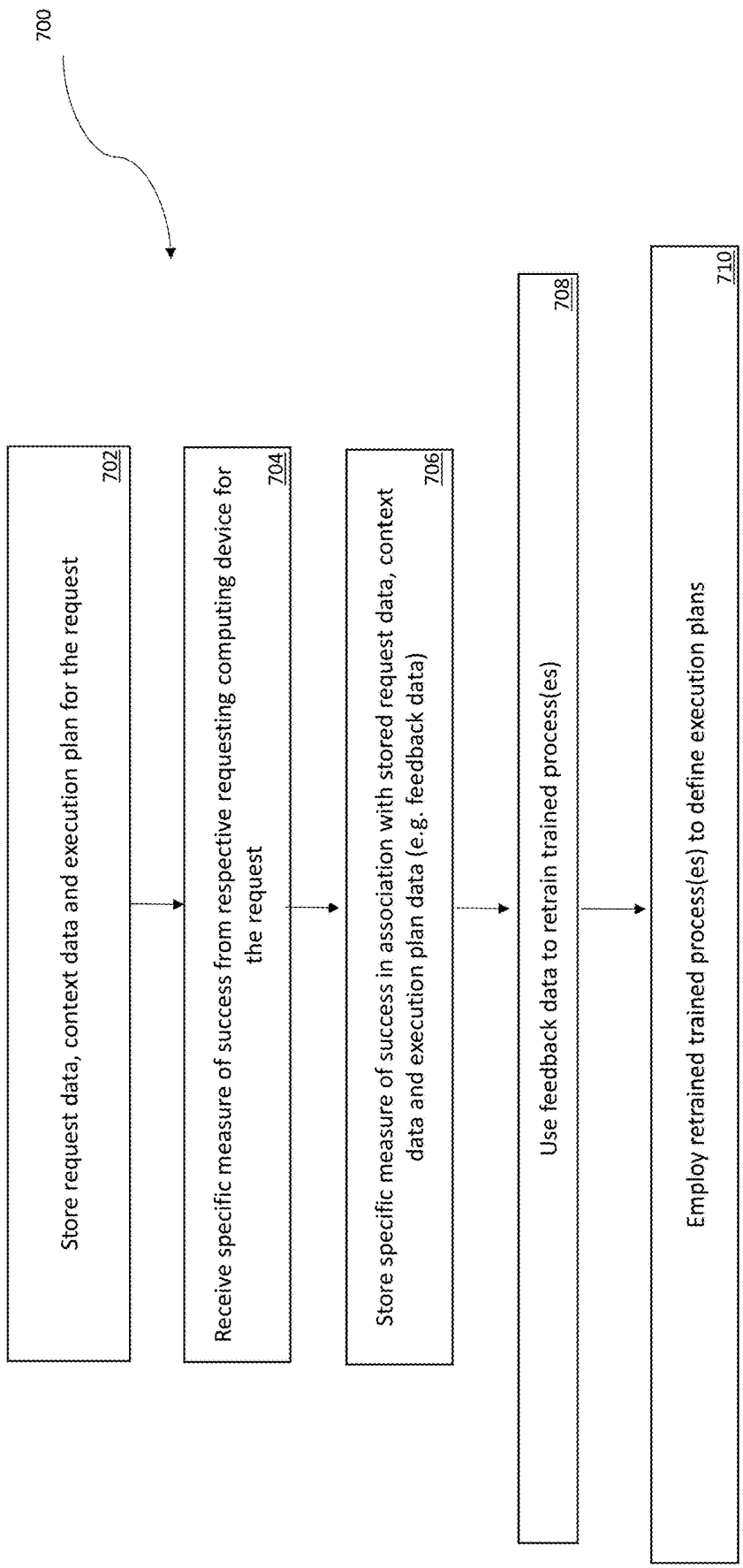

FIG. 7 is a flowchart of operations 700 to retrain the API selection module 104 (e.g. trained process 306 and/or trained process 406). At 702, following on from 612, computing device 102 stores the query data 208, context data 21 and execution plan (e.g. a set of APIs used to prepare the response). At 704 computing device 102 receives a specific measure of success from the respective requesting computing device where the specific measure of success identifies or otherwise may be associated with the respective request (and its stored data). At 706, computing device 102 stores the specific measure of success in association with the storage of the query data, context data and execution plan (together "feedback data"). The feedback data may be stored as training data 312 and/or 412. The feedback data may be annotated. At 708, The feedback data is applied to the respective machine learning algorithm 304 and/or 404 to retrain the trained process(es). Such may be applied with other stored feedback data for other respective requests in a batch or other process. At 710, the retrained trained process(es) are employed to define execution plans for new requests (e.g. in accordance with operations 600).

While the query API selection modules and context API selection modules are shown separately and comprising separate trained processes, it is understood that a single query and context API selection module may be defined (using the methods discussed above) with a single trained process trained on trained query data and trained context data with appropriate measures of success and that the single trained process may comprise a component of a query and context execution module to process "live" queries from respective requesting computing devices.

As such, the examples and flowchart show, a computing device comprising: a processor; a communications component coupled to the processor; and a storage device coupled to the processor, the storage device storing instructions to configure operation of the computing device when executed by the processor such that the computing device is configured to: receive a request from a requesting device via the communications component, the request comprising query data defining a query and context data defining contextual factors for the query, where one or more selected APIs of a plurality of APIs that invoke respective services prepare a response for the requesting device; invoke a trained process to determine an execution plan responsive to the query data and the context data, wherein the trained process is configured using training to define execution plans comprising selected APIs from the plurality of APIs, where a particular API of the plurality of APIs is selected for the execution plan if the particular API is configured to answer at least a portion of the query and the selected APIs together prepare the response optimized for the requesting device according to the context data; and provide the execution plan to an execution handling component to execute to prepare the response to send to the requesting device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

Various embodiments of the invention have been described. These and other embodiments are within the scope of the following claims.

What is claimed is:

1. A computing device comprising a processor and a storage device coupled to the processor, the storage device storing instructions to configure operation of the computing device when executed by the processor, wherein the computing device is configured to:
provide an execution plan generation component for generating a plan to respond to a request, the plan comprising one or more selected Application Programming Interfaces (APIs) from a plurality of APIs, the plan generated using a trained process trained to select a particular API of the plurality of APIs for the plan responsive to the capabilities of the particular API to answer at least a portion of the request and the selected APIs together prepare a response optimized according to a context of the request; and
in response to an update to the plurality of APIs:
retrain the trained process to accommodate the update to the plurality of APIs;
wherein the request comprises query data defining a query and context data defining contextual factors for responding to the query, the context data comprising either or both of:
requesting device data providing technical capabilities of a requesting device to process the response; or
network communication data providing technical capabilities of a network in communication with the requesting device for communicating the response; and
wherein two or more APIs of the plurality of APIs are capable to each answer the at least the portion of the request and the context data is used to optimize a selection between the two or more APIs according to the technical capabilities in the context data.

2. The computing device according to claim 1, wherein the trained process is retrained using applicable training query data and applicable training context data for the update to the plurality of APIs.

3. The computing device according to claim 1, wherein the update to the APIs comprises one of an addition of a new API, a change to or removal of one of plurality of APIs.

4. The computing device according to claim 1 configured to provide the plan to an execution handling component to execute the plan to prepare the response for communication to the requesting device.

5. The computing device according to claim 4 configured to: receive the plan at the execution handling component; prepare the response according to the plan; and send the response to the requesting device.

6. The computing device according to claim 1, wherein the trained process is retrained using a regression method or a classification method.

7. The computing device according to claim 6, wherein the classification method is a supervised method, a semi-supervisor method, or an unsupervised method.

8. The computing device according to claim 7, wherein the supervised method comprises using one or more of a neural network, a support vector machine, linear or quadratic discriminant analysis, and boosting.

9. The computing device according to claim 7, wherein the unsupervised method comprises using one or more of k-means clustering, Gaussian mixture models, and principal or independent component analysis.

10. The computing device according to claim 1, wherein the computing device is configured to collect information whether the response was successful as a specific measure of success, and adaptively train the trained process using the specific measure of success.

11. The computing device according to claim 1, wherein the context data further comprises user specific data comprising user demographic information or a user identifier indicating the user of the requesting device.

12. The computing device according to claim 1, wherein:
the requesting device data comprises: make and model data; configuration data; processor speed data; output capabilities data comprising: display type data, sound type data, natural language output data, display screen capabilities data comprising: size data, resolution data, and colour data; size of device storage data; device request interface data comprising native application data browser data or other interface data; or device location data;
the network communication data comprises: network name data; network type data; speed data; latency data; or Quality Of Service (QOS) parameters data.

13. The computing device according to claim 1, wherein the computing device is configured to assign default context data when at least some context data is missing from the request.

14. The computing device according to claim 1 configured to process the request using natural language processing techniques.

15. The computing device according to claim 1, wherein one of the selected APIs invokes a respective service which requires user authentication to access the respective service and wherein the computing device is configured to receive a user authentication for the respective service and provide the user authentication to the respective service.

16. The computing device according to claim 1, wherein the query data and the context data associated with the request are received according to one or both of: i) directly from the requesting device and ii) on behalf of the requesting device from a third party.

17. The computing device according to claim 1, wherein the execution plan generation component uses the training process as retrained to generate execution plans.

18. A method comprising:
providing an execution plan generating component to generate a plan to respond to a request, the plan comprising one or more selected Application Programming Interfaces (APIs) from a plurality of APIs, the plan generated using a trained process trained to select a particular API of the plurality of APIs for the plan responsive to the capabilities of the particular API to answer at least a portion of the request and the selected APIs together prepare a response optimized according to a context of the request; and
in response to an update to the plurality of APIs:
retraining the trained process to accommodate the update to the plurality of APIs;
wherein the request comprises query data defining a query and context data defining contextual factors for responding to the query, the context data comprising either or both of:
requesting device data providing technical capabilities of a requesting device to process the response; or
network communication data providing technical capabilities of a network in communication with the requesting device for communicating the response; and wherein two or more APIs of the plurality of APIs are capable to each answer the at least the portion of the request and the context data is used to optimize a selection between the two or more APIs according to the technical capabilities in the context data.

19. The method according to claim 18, wherein the trained process is retrained using applicable training query data and applicable training context data for the update to the plurality of APIs.

20. The method according to claim 18, wherein the update to the APIs comprises one of an addition of a new API, a change to or removal of one of plurality of APIs.

21. The method according to claim 18 comprising providing the plan to an execution handling component to execute the plan to prepare the response for communication to the requesting device.

22. The method according to claim 21 comprising receiving the plan at the execution handling component; preparing the response according to the plan; and sending the response to the requesting device.

23. The method according to claim 18, wherein the trained process is retrained using a regression method or a classification method.

24. The method according to claim 23, wherein the classification method is a supervised method, a semi-supervisor method, or an unsupervised method.

25. The method according to claim 24, wherein the supervised method comprises using one or more of a neural network, a support vector machine, linear or quadratic discriminant analysis, and boosting.

26. The method according to claim 24, wherein the unsupervised method comprises using one or more of k-means clustering, Gaussian mixture models, and principal or independent component analysis.

27. The method according to claim 18 comprising collecting information whether the response was successful as a specific measure of success, and adaptively training the trained process using the specific measure of success.

28. The method according to claim 18, wherein the context data further comprises user specific data comprising user demographic information or a user identifier indicating the user of the requesting device.

29. The method according to claim 28, comprising assigning default context data when at least some context data is missing from the request.

30. The method according to claim 18, wherein:
the requesting device data comprises: make and model data; configuration data; processor speed data; output capabilities data comprising: display type data, sound type data, natural language output data, display screen capabilities data comprising: size data, resolution data, and colour data; size of device storage data; device request interface data comprising native application data browser data or other interface data; or device location data;
the network communication data comprises: network name data; network type data; speed data; latency data; or Quality Of Service (QOS) parameters data.

31. The method according to claim 18, wherein the request is processed using natural language processing techniques.

32. The method according to claim 18, wherein one of the selected APIs invokes a respective service which requires user authentication to access the respective service and wherein the method comprises receiving a user authentication for the respective service and providing the user authentication to the respective service.

33. The method according to claim 18, wherein the query data and the context data associated with the request are received according to one or both of: i) directly from the requesting device and ii) on behalf of the requesting device from a third party.

34. A computer program product comprising a non-transient storage device storing instructions, which when executed by a processor of a computing device configure the computing device to:
providing an execution plan generating component to generate a plan to respond to a request, the plan comprising one or more selected Application Programming Interfaces (APIs) from a plurality of APIs, the plan generated using a trained process trained to select a particular API of the plurality of APIs for the plan responsive to the capabilities of the particular API to answer at least a portion of the request and the selected APIs together prepare a response optimized according to a context of the request; and
in response to an update to the plurality of APIs:
retrain the trained process to accommodate the update to the plurality of APIs;
wherein the request comprises query data defining a query and context data defining contextual factors for responding to the query, the context data comprising either or both of:
requesting device data providing technical capabilities of a requesting device to process the response; or
network communication data providing technical capabilities of a network in communication with the requesting device for communicating the response; and
wherein two or more APIs of the plurality of APIs are capable to each answer the at least the portion of the request and the context data is used to optimize a selection between the two or more APIs according to the technical capabilities in the context data.

* * * * *